United States Patent Office 3,159,686
Patented Dec. 1, 1964

3,159,686
PREPARATION OF BROMOCHLOROPICRINS
George A. Burk, Bay City, and Ralph A. Davis, Midland, Mich., assignors to The Dow Chemical Company, Midland, Mich., a corporation of Delaware
No Drawing. Filed July 29, 1963, Ser. No. 298,398
3 Claims. (Cl. 260—644)

This invention is concerned with a new chemical process. More specifically, it relates to a novel and advantageous method whereby the mixed halopicrins, bromodichloronitromethane and dibromochloronitromethane are prepared in good yields.

Chloropicrin and bromopicrin are conventionally prepared by reaction of the appropriate halogen with nitromethane in the presence of an aqueous base such as sodium hydroxide or by the reaction of picric acid with a basic metal hypochlorite or hypobromite. These halopicrins are well known fumigants and soil sterilants and they are also useful chemical intermediates.

The mixed halopicrins, i.e., bromodichloronitromethane and dibromochloronitromethane are also useful fumigants and soil sterilants which have the advantages of greater persistence than chloropicrin and better stability than bromopicrin. In the past, the only known method for obtaining these bromochloropicrins has been a stepwise halogenation such as shown by Tscherniak, Berichte 8, 610 wherein chloronitromethane was brominated to obtain dibromochloronitromethane. This method has the usual disadvantages of multistep procedures which include lowered recoveries and increased handling and reaction times as compared to more direct processes. A further disadvantage of this prior art method is a substantial degree of rearrangement occurring during the final halogenation which results in a reaction product containing not only the two mixed halopicrins but also significant proportions of chloropicrin and bromopicrin as well.

It has now been found that bromodichloronitromethane and dibromochloronitromethane are obtained in increased yield and shorter process time by a direct process distinguished by a single step halogenation. This process comprises contacting nitromethane simultaneously with both bromine and chlorine, the reaction being carried out in an aqueous system and in the presence of a water-soluble basic metal hydroxide or carbonate. Preferably, the two halogens are added to the reaction mixture as a liquid solution of chlorine in bromine. By varying the proportion of chlorine to bromine, the proportion of bromodichloronitromethane to the dibromochloro compound in the reaction product is similarly raised or lowered.

The general conditions of the reaction are those used for the conventional halogenation of nitromethane. The operable temperature range is about −20° C. to about 40° C. Lower temperatures slow the reaction to an impractical rate while higher temperatures cause loss of product by oxidation and hydrolysis side reactions. It is preferred to operate at about 10–30° C.

The basic reactant may be any of those bases conventionally used in nitromethane halogenation reactions. The water-soluble hydroxides and carbonates of alkali and alkaline earth metals are thereby included and an alkali metal hydroxide such as sodium or potassium hydroxide is usually preferred. The base is employed in aqueous solution in about the theoretical proportion of one chemical equivalent of base per mole of halogen. The aqueous reaction medium preferably includes an inert water-immiscible solvent such as carbon tetrachloride, ethylenedichloride, methylchloroform, or similar polyhalogenated lower alkane which is unreactive under the conditions of the process. Chloropicrin or a chlorobromopicrin may also be used as an auxiliary reaction solvent.

In order to obtain practical yields of the mixed halopicrins, it is necessary to use from about 2 to about 7 moles of chlorine per mole of bromine in the halogenation. Use of less than two moles of chlorine per mole of bromine yields a trihalogenated product which is almost all bromopicrin while molar ratios of chlorine above 7 to 1 produce largely chloropicrin. Best yields of bromodichloronitromethane are obtained by halogenation with about a 5/1 molar ratio of chlorine to bromine while a ratio of about 3/1 yields the highest proportion of dibromochloronitromethane. Highest total yields of mixed halopicrins are obtained by using 3 to 4 moles of chlorine per mole of bromine. The molar ratio of total halogens to nitromethane may be varied from 2.5 to 4 or more moles of halogen per mole of nitromethane. Larger quantities of halogen may be employed but no advantage is thereby gained. Best results are obtained by using slightly more than the theoretical 3 to 1 molar ratio, for example, about 3.1 to 3.5 moles of total halogen per mole of nitromethane is preferred.

This halogenation reaction can be run according to any of a number of known procedures which have been used to make chloropicrin or bromopicrin. For example, the nitromethane may be combined with an aqueous solution of the halogen and the base; the two halogens can be added simultaneously either as separate streams or as a combined stream to an alkaline solution of nitromethane; or the three reactants, i.e. the halogens, the nitromethane, and the aqueous base may be combined more or less simultaneously, for example, by running separate streams of aqueous alkali and halogen at about equivalent rates into nitromethane.

Best results are obtained and it is preferred to operate the process by adding a solution of chlorine in bromine concurrently with aqueous alkali to a stirred mixture of water, nitromethane, and a solvent such as carbon tetrachloride. The halogen solution may include an inert solvent as specified above. The rates of flow of the two solutions being added are regulated so as to provide approximately equivalent amounts of halogen and aqueous base in the reaction mixture during the addition. The organic solvent serves as a reservoir for unreacted halogen and thereby permits a smooth reaction with less chance for localized or temporary concentrations of excess alkali in the reaction mixture. This solvent also facilitates the separation of the product at the end of the reaction, this separation then being accomplished suitably by vacuum distillation of the organic layer. Under these preferred conditions, reaction times are normally in the range of 0.1–10 hours and the desired bromochloropicrins are obtainable in total yields of up to about 60–70% based on the nitromethane which is halogenated.

The following examples illustrate various ways in which the process can be operated.

*Example 1*

To a reactor flask containing 250 ml. of carbon tetrachloride, 250 ml. of water, and 31 g. of nitromethane there were added simultaneously 250 ml. of 6.0 molar KOH solution and a solution of 58 g. of chlorine in 80 g. of bromine. These amounts of halogen represent a ratio of 1.6 moles of chlorine per mole of bromine. The addition was made in 30 minutes while maintaining the temperature of the stirred reaction mixture at 0–8° C. The two solutions were added to the flask in such a manner that a slight excess of the halogens over the KOH was present in the reaction mixture up to the end of the addition period when the remainder of the KOH solution was added. The organic layer of the reaction mixture was then separated and distilled to remove solvent and incompletely reacted materials. The distillation residue consisted essentially of 11.6 mole percent of dibromochloronitromethane and 88.4 mole percent of bromopicrin and represented a recovery of 65% of the starting nitromethane as a trihalogenated product.

*Example 2*

A 6.0 molar solution of NaOH was added simultaneously with 100 g./hr. of chlorine gas and 80 g./hr. of bromine to a stirred mixture of 72 g. of nitromethane, 125 ml. of water, and 125 ml. of carbon tetrachloride at 17–28° C. The addition was completed in 2 hours at which time 160 g. of NaOH, 175 g. of chlorine, and 160 g. of bromine had been added to the reaction flask. The chlorine to bromine mole ratio was 2.5/1. The trihalogenated nitromethane fraction of the reaction product was found to contain the following distribution of compounds in mole percent.

| | Percent |
|---|---|
| $CCl_3NO_2$ | 7.5 |
| $CBrCl_2NO_2$ | 17.5 |
| $CBr_2ClNO_2$ | 32.5 |
| $CBr_3NO_2$ | 42.5 |

This crude product represented an 82% yield of total halopicrins based on the nitromethane reacted.

*Example 3*

A molar ratio of about 3/1 to 4/1 chlorine to bromine was found to produce the maximum total yield of mixed bromochloronitromethanes. In this experiment, a solution of 230 g. of chlorine in 160 g. of bromine $$(Cl_2/Br_2 = 3.25/1)$$

was added simultaneously with 667 ml. of 6.0 molar NaOH solution to a well stirred mixture of 250 ml. each of water and carbon tetrachloride and 73 g. of nitromethane. The halogen was maintained in slight continuous excess over the sodium hydroxide in the reaction mixture as in Example 1. The addition was completed in 2 hours at 11–30° C. The trihalogenated nitromethane fraction had the following mole percent composition:

| | Percent |
|---|---|
| $CCl_3NO_2$ | 13.0 |
| $CBrCl_2NO_2$ | 33.2 |
| $CBr_2ClNO_2$ | 35.4 |
| $CBr_3NO_2$ | 18.2 |

A 95% yield of distilled total halopicrins was obtained based on the starting nitromethane. This fraction was distilled under reduced pressure to obtain 50 g. of dichlorobromonitromethane, a colorless oil of essentially 100% purity, density at 25° C.=2.073, boiling point 52° C. at 22 mm. Hg, and 84 g. of chlorodibromonitromethane, a colorless oil assaying about 98% purity, density at 25° C.=2.398, boiling point 67–69° C. at 22 mm. Hg.

*Example 4*

By the general procedure of the preceding example, a solution of 280 g. of chlorine in 160 g. of bromine and 200 g. of NaOH as a 6.0 molar solution were added simultaneously to a well stirred mixture of 92 g. of nitromethane and 250 ml. each of water and carbon tetrachloride. The reaction temperature was maintained at 10–30° C. during the 1.75 hour reaction period. The molar ratio of chlorine to bromine was 4.0/1. The trihalogenated nitromethane fraction of the reaction mixture had the following mole percent composition:

| | Percent |
|---|---|
| $CCl_3NO_2$ | 20.1 |
| $CBrCl_2NO_2$ | 33.2 |
| $CBr_2ClNO_2$ | 30.1 |
| $CBr_3NO_2$ | 16.6 |

The yield of total halopicrins obtained based on the nitromethane reacted was 84%.

Examples 5 and 6 illustrate the difference in results, particularly as to yields, when a slight excess of either the halogen or the alkali is present in the reaction mixture.

*Example 5*

A solution of 369 g. of chlorine in 160 g. of bromine (5.2 moles of chlorine per mole of bromine) was added simultaneously with a liter of 6.0 molar NaOH to a stirred mixture of 250 ml. of $CCl_4$, 110 g. of nitromethane, and 250 ml. of water at 14–30° C. The addition was made over a one hour period with a slight excess of alkali being maintained in the reaction mixture over the halogen present during the addition. After all of the alkali had been added, the remaining excess of halogen was added to the reaction mixture. A highly colored reaction product was obtained. The organic layer was distilled under reduced pressure and thereby found to contain:

| | Grams |
|---|---|
| $CCl_3NO_2$ | 44 |
| $CBrCl_2NO_2$ | 133 |
| $CBr_2ClNO_2$ | 106 |
| $CBr_3NO_2$ | 16 |

This represents a crude yield of 76% of total halopicrins based on the starting nitromethane.

*Example 6*

Example 5 was repeated using the same quantities of reactants but maintaining in the reaction mixture a slight excess of halogen over the alkali throughout. The reaction period in this case was 2 hours and the temperature was held at 17–28° C. The reaction mixture was only slightly colored. Distillation under reduced pressure showed the presence in the reaction mixture of the following halopicrins:

| | Grams |
|---|---|
| $CCl_3NO_2$ | 92 |
| $CBrCl_2NO_2$ | 132 |
| $CBr_2ClNO_2$ | 91 |
| $CBr_3NO_2$ | 36 |

A yield of 92% of crude halopicrins was obtained, based on the starting nitromethane.

*Example 7*

To a stirred solution of hypohalite prepared by combining a solution of 200 g. of chlorine in 80 g. of bromine with 2.5 liters of 6.0 molar NaOH there was added 48 g. of nitromethane in 15 minutes at 9–15° C. A 76% yield of crude halopicrins was obtained with the following mole percent distribution:

| | Percent |
|---|---|
| $CCl_3NO_2$ | 36.7 |
| $CBrCl_2NO_2$ | 32.2 |
| $CBr_2ClNO_2$ | 18.4 |
| $CBr_3NO_2$ | 12.8 |

*Example 8*

Example 7 was repeated at −5 to −10° C. with the nitromethane added in 5 minutes. A 92% yield of halopicrins was obtained having substantially the same distribution of individual compounds as obtained in the previous example.

Example 9 illustrates the disadvantages in preparing mixed halopicrins by a two-step halogenation of nitromethane using prior art methods. Not only are operating difficulties greatly increased by the two separate halogenations and the larger reaction volumes employed but also considerably lower yields of the desired mixed halopicrins are thereby obtained as compared to the present direct process.

*Example 9*

Monobromonitromethane was prepared by the method of Slagh, U.S. 2,632,776. A solution of 122 g. of nitromethane and 80 g. of NaOH in water to make 2.5 liters was combined at 5° C. with 320 g. of bromine. A crude product was obtained which contained about 90 mole percent of monobromonitromethane and 10% of dibromomethane in 70.7% total yield based on the starting nitromethane.

A 106 gram color-distilled portion of this material was then reacted with a hypochlorite solution prepared by combining 112 g. of chlorine with 120 g. of NaOH in one liter of water. An additional 73 g. of chlorine was then passed into the reaction mixture. Separation of the crude reaction product yielded 138 g. of an oil containing 0.344 g. mole of $CBrCl_2NO_2$ and 0.128 g. mole of $CBr_2ClNO_2$. The remainder of the product was bromopicrin (0.036 g. mole) and chloropicrin (0.138 g. mole). Evidently there was an appreciable amount of rearrangement. The above results represent a total of 0.46 g. mole of mixed halopicrins ($CBrCl_2NO_2$ and $CBr_2ClNO_2$) obtained from one mole of nitromethane by this process. This compares to a yield of 0.653 g. mole of mixed halopicrins obtained from a mole of nitromethane by the direct process as shown in Example 3.

We claim:

1. In a process for making a halopicrin by reacting nitromethane with a halogen and an alkali base in an aqueous reaction mixture, the improvement wherein the halogen consists of chlorine and bromine in a molar ratio of about 2 to about 7 moles of chlorine per mole of bromine.

2. The process of claim 1 wherein the reaction mixture includes an inert water-immiscible solvent.

3. A process for making a bromochloropicrin which comprises reacting by contacting at about −20° C. to about 40° C. a mole of nitromethane with about 2.5 to about 4 moles of a halogen mixture, said mixture consisting essentially of chlorine and bromine in a proportion of about 2 to about 7 moles of chlorine per mole of bromine, and about 1 mole of aqueous alkali metal hydroxide per mole of total halogen, said process being carried out in a solvent medium consisting essentially of water and carbon tetrachloride.

No references cited.